US011660526B2

United States Patent
Ohashi (10) Patent No.: US 11,660,526 B2
(45) Date of Patent: May 30, 2023

(54) ESTIMATION APPARATUS, ESTIMATION METHOD, AND PROGRAM

(71) Applicant: SONY INTERACTIVE ENTERTAINMENT INC., Tokyo (JP)

(72) Inventor: Yoshinori Ohashi, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 158 days.

(21) Appl. No.: 16/969,139

(22) PCT Filed: Mar. 1, 2018

(86) PCT No.: PCT/JP2018/007716
§ 371 (c)(1),
(2) Date: Aug. 11, 2020

(87) PCT Pub. No.: WO2019/167214
PCT Pub. Date: Sep. 6, 2019

(65) Prior Publication Data
US 2021/0038974 A1    Feb. 11, 2021

(51) Int. Cl.
*A63F 13/212*    (2014.01)
*G06N 20/00*    (2019.01)
(Continued)

(52) U.S. Cl.
CPC ............ *A63F 13/212* (2014.09); *G06F 3/011* (2013.01); *G06N 20/00* (2019.01); *A63F 13/211* (2014.09);
(Continued)

(58) Field of Classification Search
CPC ...... A63F 13/12; A63F 13/211; A63F 13/213; A63F 13/215; A63F 2300/1012
See application file for complete search history.

(56) References Cited

U.S. PATENT DOCUMENTS 5,109,475 A * 4/1992 Kosaka ............. G06Q 10/04
706/19
5,956,702 A * 9/1999 Matsuoka .......... G06N 3/049
704/250

(Continued)

FOREIGN PATENT DOCUMENTS

JP    10-040418 A    2/1998
JP    10-040419 A    2/1998
(Continued)

OTHER PUBLICATIONS

International Search Report and Written Opinion dated May 15, 2018, from the corresponding PCT/JP2018/007716, 9 sheets.
(Continued)

*Primary Examiner* — David L Lewis
*Assistant Examiner* — Shauna-Kay Hall
(74) *Attorney, Agent, or Firm* — Katten Muchin Rosenman LLP (57) ABSTRACT

Provided are a body part orientation estimation apparatus, a body part orientation estimation method, and a program that enable accurate body tracking without having the user wear many trackers. A time-series data input section (68) acquires a plurality of pieces of time-series data each representing positions, postures, or motions of a part of a body. The time-series data input section (68) inputs the plurality of pieces of time-series data into a conversion section (60). An output acquisition section (70) acquires a result of estimation of a position, a posture, or a motion of another part of the body that is closer to a center of the body than the part, the result of the estimation being an output obtained when the pieces of time-series data are input into the conversion section (60).

6 Claims, 6 Drawing Sheets

(51) Int. Cl.
*G06F 3/01* (2006.01)
*A63F 13/211* (2014.01)
*A63F 13/213* (2014.01)
*A63F 13/215* (2014.01)

(52) U.S. Cl.
CPC ........... *A63F 13/213* (2014.09); *A63F 13/215* (2014.09); *A63F 2300/1012* (2013.01)

(56) References Cited

U.S. PATENT DOCUMENTS

| | | | | |
|---|---|---|---|---|
| 2009/0278791 | A1* | 11/2009 | Slycke | A61B 5/6807 345/156 |
| 2009/0322763 | A1* | 12/2009 | Bang | G06V 40/23 73/865.4 |
| 2012/0293518 | A1* | 11/2012 | Geisner | A63F 13/213 345/474 |
| 2015/0192413 | A1* | 7/2015 | Bellusci | A61B 5/1114 702/152 |
| 2016/0054449 | A1* | 2/2016 | Pekonen | A61B 5/1112 342/357.57 |

FOREIGN PATENT DOCUMENTS

| | | |
|---|---|---|
| JP | 2000-132305 A | 5/2000 |
| JP | 2001-236520 A | 8/2001 |
| JP | 2014-530047 A | 11/2014 |
| JP | 2017-511906 A | 4/2017 |
| JP | 2017-520336 A | 7/2017 |
| JP | 2017-535830 A | 11/2017 |
| WO | 2013/041444 A1 | 3/2013 |
| WO | 2015114468 A2 | 8/2015 |
| WO | 2015/142877 A1 | 9/2015 |
| WO | 2016033279 A1 | 3/2016 |

OTHER PUBLICATIONS

International Preliminary Report on Patentability dated Sep. 10, 2020, from the corresponding PCT/JP2018/007716, 13 sheets.

Notice of Reasons for Refusal dated Feb. 2, 2021, from the corresponding Japanese Patent Application No. 2020-503200, 3 sheets.

* cited by examiner

ESTIMATION APPARATUS, ESTIMATION METHOD, AND PROGRAM

TECHNICAL FIELD

The present invention relates to an estimation apparatus, an estimation method, and a program.

BACKGROUND ART

A known body tracking technique uses inverse kinematics (IK) to estimate the positions and orientations of a plurality of parts included in the body of the user on the basis of pieces of data representing the positions and orientations of a plurality of trackers worn by the user. The plurality of parts includes parts with no trackers worn thereon.

SUMMARY

Technical Problems

At present, a user needs to wear a tracker on a chest or a waist to realize accurate body tracking. However, wearing the tracker on the chest or waist is troublesome for the user.

Further, in body tracking, even if there is data representing the position and orientation of the tracker worn on a hand, it is not possible, in some cases, to accurately estimate the position of an elbow without data representing the orientation of a wrist. For example, when a motion of only moving a hand, such as a hand wave motion, is performed, the estimation result obtained may be, in some cases, the position of the elbow that has moved significantly, despite the fact that the elbow has not moved significantly. However, wearing the tracker on the wrist is also troublesome for the user.

The present invention has been made in view of the above-described problems. One of objects of the present invention is to provide an estimation apparatus, an estimation method, and a program that enable accurate body tracking without having the user wear many trackers.

Solution to Problems

In order to solve the above-described problems, an estimation apparatus according to the present invention includes: a time-series data acquisition section configured to acquire a plurality of pieces of time-series data each representing positions, postures, or motions of a part of a body; an input section configured to input the plurality of pieces of time-series data into a conversion section; and an output acquisition section configured to acquire a result of estimation of a position, a posture, or a motion of another part of the body that is closer to a center of the body than the part, the result of the estimation being an output obtained when the pieces of time-series data are input into the conversion section.

In a mode of the present invention, the plurality of pieces of time-series data includes pieces of time-series data for parts different from each other.

In this aspect, the input section may input first time-series data representing orientations of a head included in the body, second time-series data representing angular velocities of a left hand included in the body, and third time-series data representing angular velocities of a right hand included in the body into the conversion section, and the output acquisition section may acquire a result of estimation of an orientation of a chest or a waist included in the body or a result of estimation of an angular velocity of the chest or the waist included in the body.

Further, in a mode of the present invention, the plurality of pieces of time-series data includes at least two of time-series data representing orientations of the part, time-series data representing angular velocities of the part, time-series data representing positions of the part, and time-series data representing velocities of the part.

In this mode, the input section may input first time-series data representing orientations of a hand included in the body, second time-series data representing angular velocities of the hand, and third time-series data representing positions or velocities of the hand into the conversion section, and the output acquisition section may acquire a result of estimation of an orientation or an angular velocity of a wrist on a side of the hand included in the body.

Further, in a mode of the present invention, the conversion section includes a machine learning model that has finished learning.

Further, an estimation method according to the present invention includes: a step of acquiring a plurality of pieces of time-series data each representing positions, postures, or motions of a part of a body; a step of inputting the plurality of pieces of time-series data into a conversion section; and a step of acquiring a result of estimation of a position, a posture, or a motion of another part of the body that is closer to a center of the body than the part, the result of the estimation being an output obtained when the pieces of time-series data are input into the conversion section.

Further, a program according to the present invention causes a computer to execute: a procedure of acquiring a plurality of pieces of time-series data each representing positions, postures, or motions of a part of a body; a procedure of inputting the plurality of pieces of time-series data into a conversion section; and a procedure of acquiring a result of estimation of a position, a posture, or a motion of another part of the body that is closer to a center of the body than the part, the result of the estimation being an output obtained when the pieces of time-series data are input into the conversion section.

DESCRIPTION OF EMBODIMENT

Figure 1:
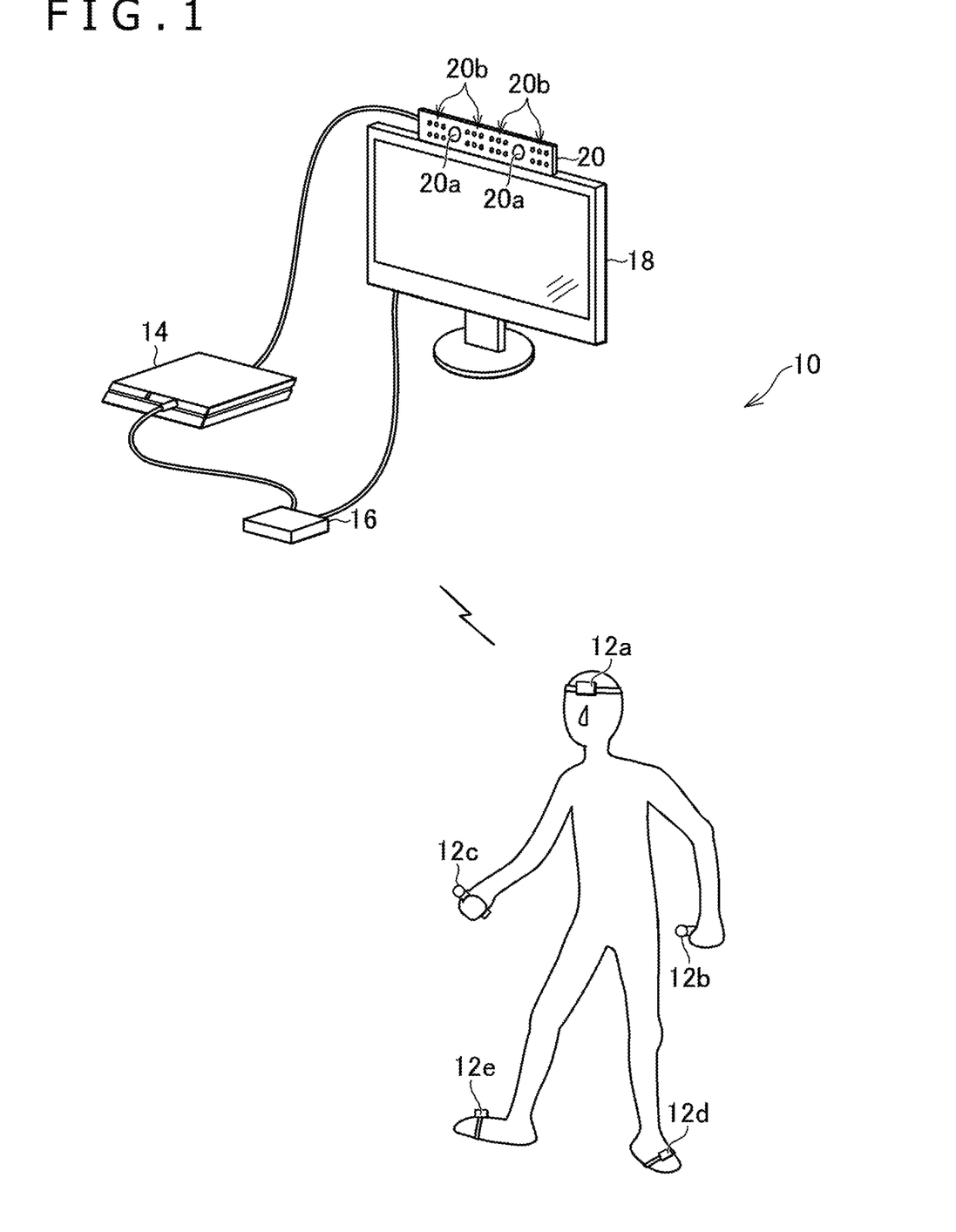
FIG. 1 is a configuration diagram illustrating an example of an entertainment system according to an embodiment of the present invention.
Figure 2:
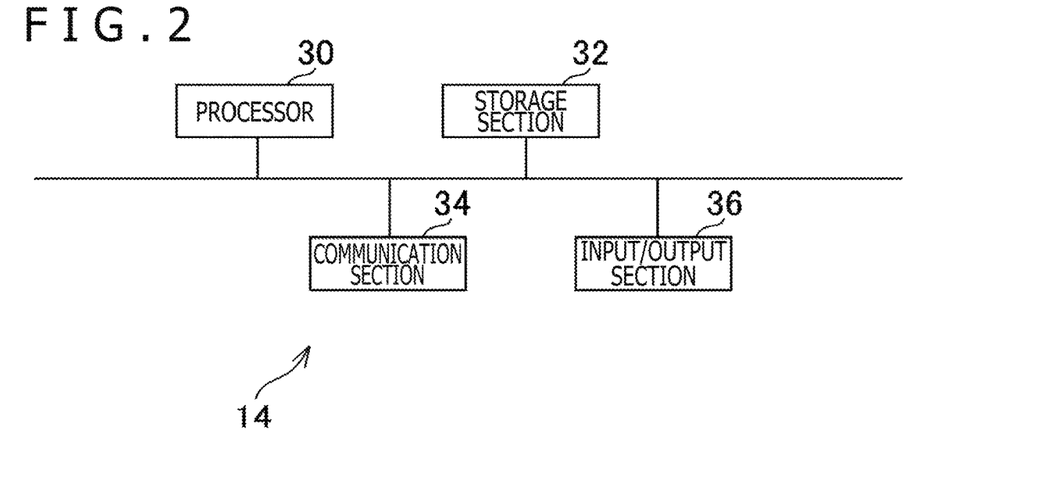
FIG. 2 is a configuration diagram illustrating an example of an entertainment apparatus according to the embodiment of the present invention.

FIG. 1 is a diagram illustrating an example of a configuration of an entertainment system 10 according to an embodiment of the present invention. FIG. 2 is a diagram illustrating an example of a configuration of an entertainment apparatus 14 according to the present embodiment.

As illustrated in FIG. 1, the entertainment system 10 according to the present embodiment includes a plurality of trackers 12 (trackers 12a to 12e in the example in FIG. 1), the entertainment apparatus 14, a relay apparatus 16, a display 18, and a camera-microphone unit 20.

Each tracker 12 according to the present embodiment is, for example, a device for tracking the position and orientation thereof. Here, each tracker 12 may include various types of sensors such as a camera, an inertial sensor (IMU), a geomagnetic sensor (azimuth sensor), an acceleration sensor, a motion sensor, and a GPS (Global Positioning System) module, for example. In addition, each tracker 12 may identify the position and orientation thereof on the basis of sensing data, that is, measurement results of sensors included in the tracker 12.

Further, for example, the position and orientation of each tracker 12 may be identified on the basis of an image including an image of each tracker 12 captured by a camera 20a. The camera 20a is included in the camera-microphone unit 20 to be described later.

In the present embodiment, the tracker 12a, the tracker 12b, the tracker 12c, the tracker 12d, and the tracker 12e are worn on the user's head, left hand, right hand, left foot, and right foot, respectively. Here, as illustrated in FIG. 1, the tracker 12b and the tracker 12c may be held by the user's hands. In the present embodiment, the position and orientation identified by each of the tracker 12a, the tracker 12b, the tracker 12c, the tracker 12d, and the tracker 12e correspond to the position and orientation of each of the user's head, left hand, right hand, left foot, and right foot, respectively. In the present embodiment, the positions and orientations of the plurality of parts included in the body of the user are identified by the plurality of trackers 12 in this manner.

The entertainment apparatus 14 according to the present embodiment is a computer such as a game console, a DVD (Digital Versatile Disc) player, or a Blu-ray (registered trademark) player, for example. The entertainment apparatus 14 according to the present embodiment generates a video and audio by executing a game program, reproducing content, or the like, for example. The game program and the content are stored in the entertainment apparatus 14 or recorded on an optical disc. In addition, the entertainment apparatus 14 according to the present embodiment outputs video signals representing the generated video and audio signals representing the generated audio to the display 18 via the relay apparatus 16.

As illustrated in FIG. 2, the entertainment apparatus 14 according to the present embodiment includes a processor 30, a storage section 32, a communication section 34, and an input/output section 36, for example.

The processor 30 is, for example, a program control device, such as a Central Processing Unit (CPU), that operates according to programs installed in the entertainment apparatus 14. The processor 30 according to the present embodiment also includes a GPU (Graphics Processing Unit) that draws an image in a frame buffer on the basis of a graphics command and data supplied from the CPU.

The storage section 32 is, for example, a storage element, such as a Read-Only Memory (ROM) or a Random Access Memory (RAM), a hard disk drive, or the like. The programs and the like to be executed by the processor 30 are stored in the storage section 32. Further, an area of a frame buffer in which the GPU draws an image is reserved in the storage section 32 according to the present embodiment.

The communication section 34 is, for example, a communication interface or the like such as a wireless Local Area Network (LAN) module.

The input/output section 36 is an input/output port, such as an HDMI (registered trademark) (High-Definition Multimedia Interface) port or a Universal Serial Bus (USB) port.

The relay apparatus 16 according to the present embodiment is a computer that relays video signals and audio signals output from the entertainment apparatus 14 and outputs the video signals and audio signals to the display 18.

The display 18 according to the present embodiment is, for example, a liquid crystal display or the like, and displays a video and the like represented by the video signals output from the entertainment apparatus 14.

The camera-microphone unit 20 according to the present embodiment includes the camera 20a and a microphone 20b, for example. The camera 20a outputs an image obtained by capturing a subject to the entertainment apparatus 14. The microphone 20b acquires surrounding sound, converts the sound into audio data, and outputs the audio data to the entertainment apparatus 14. Further, the camera 20a according to the present embodiment is a stereo camera.

The trackers 12 and the relay apparatus 16 can, for example, wirelessly transmit and receive data to and from each other. The entertainment apparatus 14 and the relay apparatus 16 are, for example, connected via an HDMI cable, a USB cable, or the like, and can transmit and receive data to and from each other. The relay apparatus 16 and the display 18 are, for example, connected via an HDMI cable or the like. The entertainment apparatus 14 and the camera-microphone unit 20 are, for example, connected via an Auxiliary (AUX) cable or the like.

Figure 3:
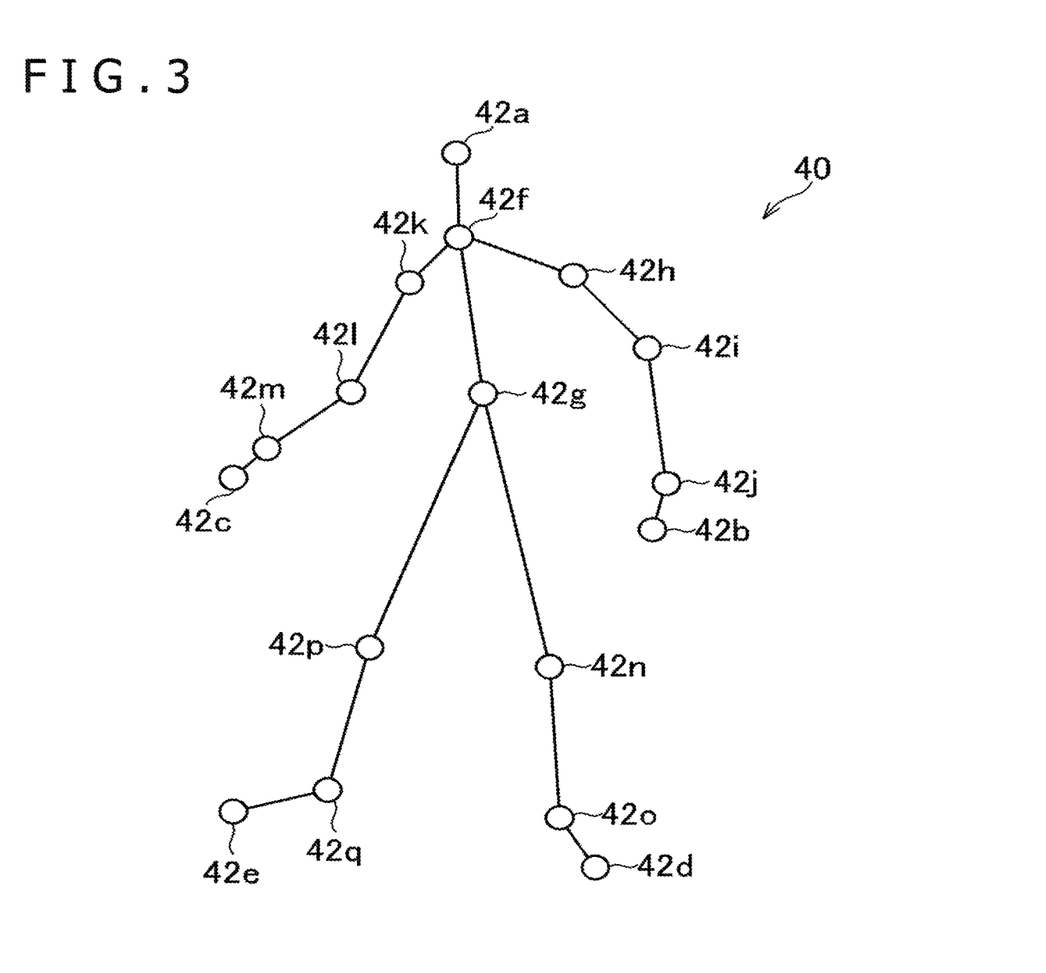
FIG. 3 is a diagram illustrating an example of a skeleton model.

In the present embodiment, for example, while the game program is executed by the entertainment apparatus 14, various types of processes of game processing or the like corresponding to the positions or orientations of a plurality of parts included in the body of the user in a skeleton model 40 illustrated in FIG. 3 are performed. Then, a video corresponding to the result of the processes is displayed on the display 18, for example.

As illustrated in FIG. 3, the skeleton model 40 according to the present embodiment includes a head node 42a, a left-hand node 42b, a right-hand node 42c, a left-foot node 42d, and a right-foot node 42e. The head node 42a corresponds to the head of the user wearing the tracker 12a. The left-hand node 42b corresponds to the left hand of the user wearing the tracker 12b. The right-hand node 42c corresponds to the right hand of the user wearing the tracker 12c. The left-foot node 42d corresponds to the left foot of the user wearing the tracker 12d. The right-foot node 42e corresponds to the right foot of the user wearing the tracker 12e.

Further, in addition to the above-described nodes 42, the skeleton model 40 also includes a chest node 42f, a waist node 42g, a left-shoulder node 42h, a left-elbow node 42i, and a left-wrist node 42j. Further, the skeleton model 40 also includes a right-shoulder node 42k, a right-elbow node 42l, a right-wrist node 42m, a left-knee node 42n, a left-ankle node 42o, a right-knee node 42p, and a right-ankle node 42q.

Here, as illustrated in FIG. 3, the head node 42a and the chest node 42f are connected to each other by a link. Further, the chest node 42f and the waist node 42g are connected to each other by a link.

Further, the chest node 42f and the left-shoulder node 42h are connected to each other by a link. Further, the left-shoulder node 42h and the left-elbow node 42i are connected to each other by a link. Further, the left-elbow node 42i and the left-wrist node 42j are connected to each other by a link. Further, the left-wrist node 42j and the left-hand node 42b are connected to each other by a link.

Further, the chest node 42f and the right-shoulder node 42k are connected to each other by a link. Further, the right-shoulder node 42k and the right-elbow node 42l are connected to each other by a link. Further, the right-elbow node 42l and the right-wrist node 42m are connected to each other by a link. Further, the right-wrist node 42m and the right-hand node 42c are connected to each other by a link.

Further, the waist node 42g and the left-knee node 42n are connected to each other by a link. Further, the left-knee node 42n and the left-ankle node 42o are connected to each other by a link. Further, the left-ankle node 42o and the left-foot node 42d are connected to each other by a link.

Further, the waist node 42g and the right-knee node 42p are connected to each other by a link. Further, the right-knee node 42p and the right-ankle node 42q are connected to each other by a link. Further, the right-ankle node 42q and the right-foot node 42e are connected to each other by a link.

These nodes 42 correspond to respective parts included in the body of the user. In addition, the present embodiment enables body tracking based on the positions and orientations identified for the plurality of trackers 12, for example. Here, the position of each of the plurality of nodes 42 included in the skeleton model 40 relative to a reference position in an initial state and the orientation thereof relative to a reference orientation in the initial state are estimated, for example.

Here, for example, the position and orientation of the head node 42a can be determined on the basis of data representing the position and orientation identified for the tracker 12a. Similarly, the position and orientation of the left-hand node 42b can be determined on the basis of data representing the position and orientation identified for the tracker 12b. Further, the position and orientation of the right-hand node 42c can be determined on the basis of data representing the position and orientation identified for the tracker 12c. Further, the position and orientation of the left-foot node 42d can be determined on the basis of data representing the position and orientation identified for the tracker 12d. Further, the position and orientation of the right-foot node 42e can be determined on the basis of data representing the position and orientation identified for the tracker 12e.

One conceivable method here is to use inverse kinematics (IK) to estimate the positions and orientations of the other nodes 42 on the basis of the pieces of data representing the determined positions and orientations of the head node 42a, the left-hand node 42b, the right-hand node 42c, the left-foot node 42d, and the right-foot node 42e.

In this case, however, unless there is information about the orientation of the chest node 42f or the waist node 42g, the positions and orientations of the other nodes 42 cannot be estimated using inverse kinematics.

Further, even if there is data representing the position and orientation of the left-hand node 42b, it is, in some cases, difficult to estimate the position and orientation of the left-elbow node 42i using inverse kinematics unless there is information about the orientation of the left-wrist node 42j. For example, when a motion of only moving the hand, such as a hand wave motion, is performed, the estimation result obtained may be, in some cases, the position of the elbow that has moved significantly, despite the fact that the elbow has not moved significantly.

Similarly, even if there is data representing the position and orientation of the right-hand node 42c, it is, in some cases, difficult to estimate the position and orientation of the right-elbow node 42l using inverse kinematics unless there is information about the orientation of the right-wrist node 42m.

In view of the foregoing, the present embodiment enables accurate estimation of the orientation of the chest node 42f or the waist node 42g on the basis of the pieces of data representing the positions and orientations of the head node 42a, the left-hand node 42b, the right-hand node 42c, the left-foot node 42d, and the right-foot node 42e as described below. Further, the present embodiment enables accurate estimation of the orientations of the left-wrist node 42j and the right-wrist node 42m on the basis of the pieces of data representing the positions and orientations of the head node 42a, the left-hand node 42b, the right-hand node 42c, the left-foot node 42d, and the right-foot node 42e as described below.

It is noted that in the present embodiment, the position and orientation of each of the trackers 12a to 12e are identified at a predetermined sampling rate, for example. Then, pieces of data representing the positions and orientations of the trackers 12 are transmitted to the entertainment apparatus 14 in response to the identification of the positions and orientations of the trackers 12. Then, the entertainment apparatus 14 performs the above-described orientation estimation based on these pieces of data.

Hereinafter, the estimation of the orientation of the chest node 42f will be described. It is noted that the orientation of the waist node 42g can be similarly estimated by the method described below.

Figure 4:
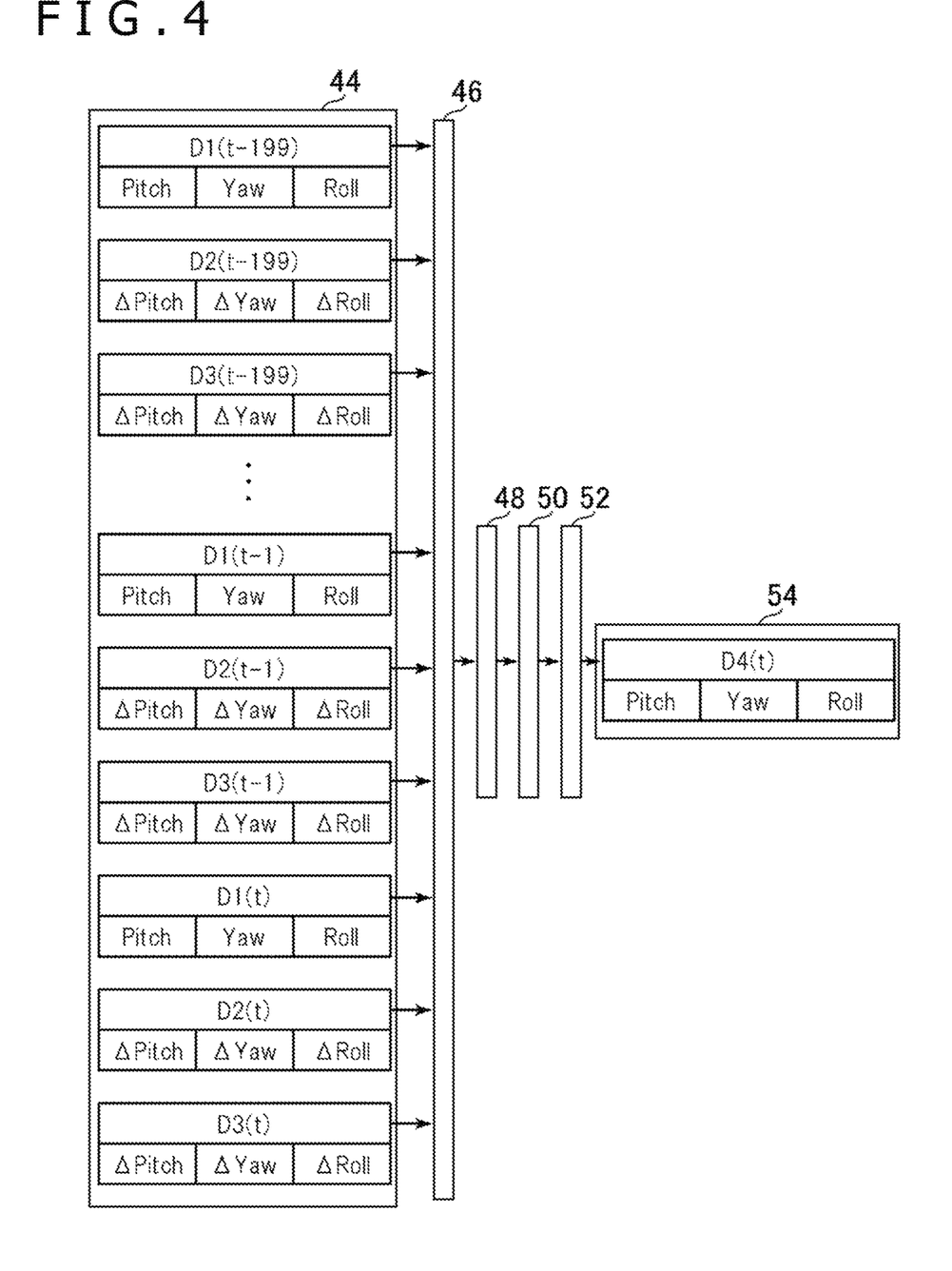
FIG. 4 is a diagram illustrating an example of a machine learning model used to estimate the orientation of a chest node.

FIG. 4 is a diagram illustrating an example of a machine learning model used to estimate the orientation of the chest node 42f. As illustrated in FIG. 4, the machine learning model used to estimate the orientation of the chest node 42f includes an input layer 44, an intermediate block 46, a first intermediate layer 48, a second intermediate layer 50, and an output layer 52.

In the present embodiment, for example, time-series data D1, time-series data D2, and time-series data D3 are input into the input layer 44 in response to the identification of the positions and orientations performed by the trackers 12. The time-series data D1 represents a time series of orientations of the head. The time-series data D2 represents a time series of angular velocities of the left hand. The time-series data D3 represents a time series of angular velocities of the right hand.

In the present embodiment, for example, data representing a time series of orientations of the tracker 12a for the last 200 identifications is input into the input layer 44 as the time-series data D1 (D1(t−199) to D1(t)).

Here, for example, data representing the orientation of the tracker 12a at the latest identification timing is represented as the data D1(t). Further, data representing the orientation of the tracker 12a at the immediately preceding identification timing is represented as the data D1(t−1). Further, data representing the orientation of the tracker 12a at the identification timing 199 times before is represented as the data D1(t−199).

Further, in the present embodiment, as illustrated in FIG. 4, the time-series data D1(D1(t−199) to D1(t)) each includes three elements of a pitch angle (Pitch), a yaw angle (Yaw), and a roll angle (Roll). For example, the pitch angle, the yaw angle, and the roll angle respectively correspond to the pitch angle, the yaw angle, and the roll angle relative to the above-described reference orientation.

Further, in the present embodiment, the difference between a value of data representing the previously identified orientation and a value of data representing the orientation identified this time is used as a value representing an angular velocity. In addition, in the present embodiment, data representing a time series of angular velocities of the tracker 12b based on pieces of data representing the orientations of the tracker 12b for the last 201 identifications is input into the input layer 44 as the time-series data D2 (D2(t−199) to D2(t)).

Here, for example, data representing the angular velocity corresponding to the difference between the orientation of the tracker 12b at the latest identification timing and the orientation of the tracker 12b at the immediately preceding identification timing is represented as the data D2(t). Further, data representing the angular velocity corresponding to the difference between the orientation of the tracker 12b at the immediately preceding identification timing and the orientation of the tracker 12b at the identification timing two times before is represented as the data D2(t−1). In addition, data representing the angular velocity corresponding to the difference between the orientation of the tracker 12b at the identification timing 199 times before and the orientation of the tracker 12b at the identification timing 200 times before is represented as the data D2(t−199).

Further, in the present embodiment, as illustrated in FIG. 4, the time-series data D2(D2(t−199) to D2(t)) each includes three elements of a pitch angular velocity (ΔPitch), a yaw angular velocity (ΔYaw), and a roll angular velocity (ΔRoll). Here, the pitch angular velocity, the yaw angular velocity, and the roll angular velocity respectively correspond to the difference between pitch angles, the difference between yaw angles, and the difference between roll angles at two consecutive identification timings. Each of these angles is relative to the above-described reference orientation.

Further, in the present embodiment, data representing a time series of angular velocities of the tracker 12c based on pieces of data representing the orientations of the tracker 12c for the last 201 identifications is input into the input layer 44 as the time-series data D3 (D3 (t−199) to D3(t)).

Here, for example, data representing the angular velocity corresponding to the difference between the orientation of the tracker 12c at the latest identification timing and the orientation of the tracker 12c at the immediately preceding identification timing is represented as the data D3(t). Further, data representing the angular velocity corresponding to the difference between the orientation of the tracker 12c at the immediately preceding identification timing and the orientation of the tracker 12c at the identification timing two times before is represented as the data D3(t−1). In addition, data representing the angular velocity corresponding to the difference between the orientation of the tracker 12c at the identification timing 199 times before and the orientation of the tracker 12c at the identification timing 200 times before is represented as the data D3(t−199).

Further, in the present embodiment, as illustrated in FIG. 4, the time-series data D3 (D3(t−199) to D3(t)) each includes three elements of a pitch angular velocity (ΔPitch), a yaw angular velocity (ΔYaw), and a roll angular velocity (ΔRoll). As described above, the pitch angular velocity, the yaw angular velocity, and the roll angular velocity respectively correspond to the difference between pitch angles, the difference between yaw angles, and the difference between roll angles at two consecutive identification timings. Each of these angles is relative to the above-described reference orientation.

As described above, in the present embodiment, the pieces of data including 1800 (200×3×3) elements are input into the input layer 44.

In addition, the above-described pieces of data input into the input layer 44 are input into the intermediate block 46. In the present embodiment, the intermediate block 46 is, for example, an RNN (Recurrent Neural Network) (LSTM block) with LSTM (Long short-term memory) implemented.

Then, an output from the intermediate block 46 is input into the first intermediate layer 48. Then, an output from the first intermediate layer 48 is input into the second intermediate layer 50. Each of the first intermediate layer 48 and the second intermediate layer 50 is, for example, a fully connected layer that uses a rectified linear function (ReLU) as an activation function.

Then, an output from the second intermediate layer 50 is input into the output layer 52. The output layer 52 is, for example, a layer that uses a linear function as an activation function. Then, the output layer 52 outputs data D4(t) as an output 54. The data D4(t) corresponds to the orientation of the chest at the latest identification timing. As illustrated in FIG. 4, the time-series data D4(t) includes three elements of a pitch angle (Pitch), a yaw angle (Yaw), and a roll angle (Roll). The pitch angle, the yaw angle, and the roll angle respectively correspond to the pitch angle, the yaw angle, and the roll angle relative to the above-described reference orientation, for example.

In the present embodiment, the machine learning model illustrated in FIG. 4 is assumed to have learned from data representing the orientation of the chest associated with a combination of the orientation of the head, the angular velocity of the left hand, and the angular velocity of the right hand in advance. Therefore, in the present embodiment, the data D4(t), which is the output obtained when the time-series data D1, the time-series data D2, and the time-series data D3 are input into the machine learning model in FIG. 4 that has finished learning, corresponds to the result of the estimation of the orientation of the chest node 42f.

Here, the machine learning model illustrated in FIG. 4 may have learned from data representing the orientation of the waist associated with a combination of the orientation of the head, the angular velocity of the left hand, and the angular velocity of the right hand in advance. In this case, the data D4(t), which is the output obtained when the time-series data D1, the time-series data D2, and the time-series data D3 are input into the machine learning model in FIG. 4 that has finished learning, corresponds to the result of the estimation of the orientation of the waist node 42g.

Further, the machine learning model illustrated in FIG. 4 may have learned from data representing the angular velocity of the chest associated with a combination of the orientation of the head, the angular velocity of the left hand, and the angular velocity of the right hand in advance. In this case, the data D4(t), which is the output obtained when the time-series data D1, the time-series data D2, and the time-series data D3 are input into the machine learning model in FIG. 4 that has finished learning, corresponds to the result of the estimation of the angular velocity of the chest node 42f.

Further, the machine learning model illustrated in FIG. 4 may have learned from data representing the angular velocity of the waist associated with a combination of the orientation of the head, the angular velocity of the left hand, and the angular velocity of the right hand in advance. In this case, the data D4(t), which is the output obtained when the time-series data D1, the time-series data D2, and the time-series data D3 are input into the machine learning model in FIG. 4 that has finished learning, corresponds to the result of the estimation of the angular velocity of the waist node 42g.

In this manner, in the present embodiment, the orientation of the chest node 42f or the waist node 42g or the angular velocity of the chest node 42f or the waist node 42g based on the pieces of time-series data D1 to D3 is estimated.

Figure 5:
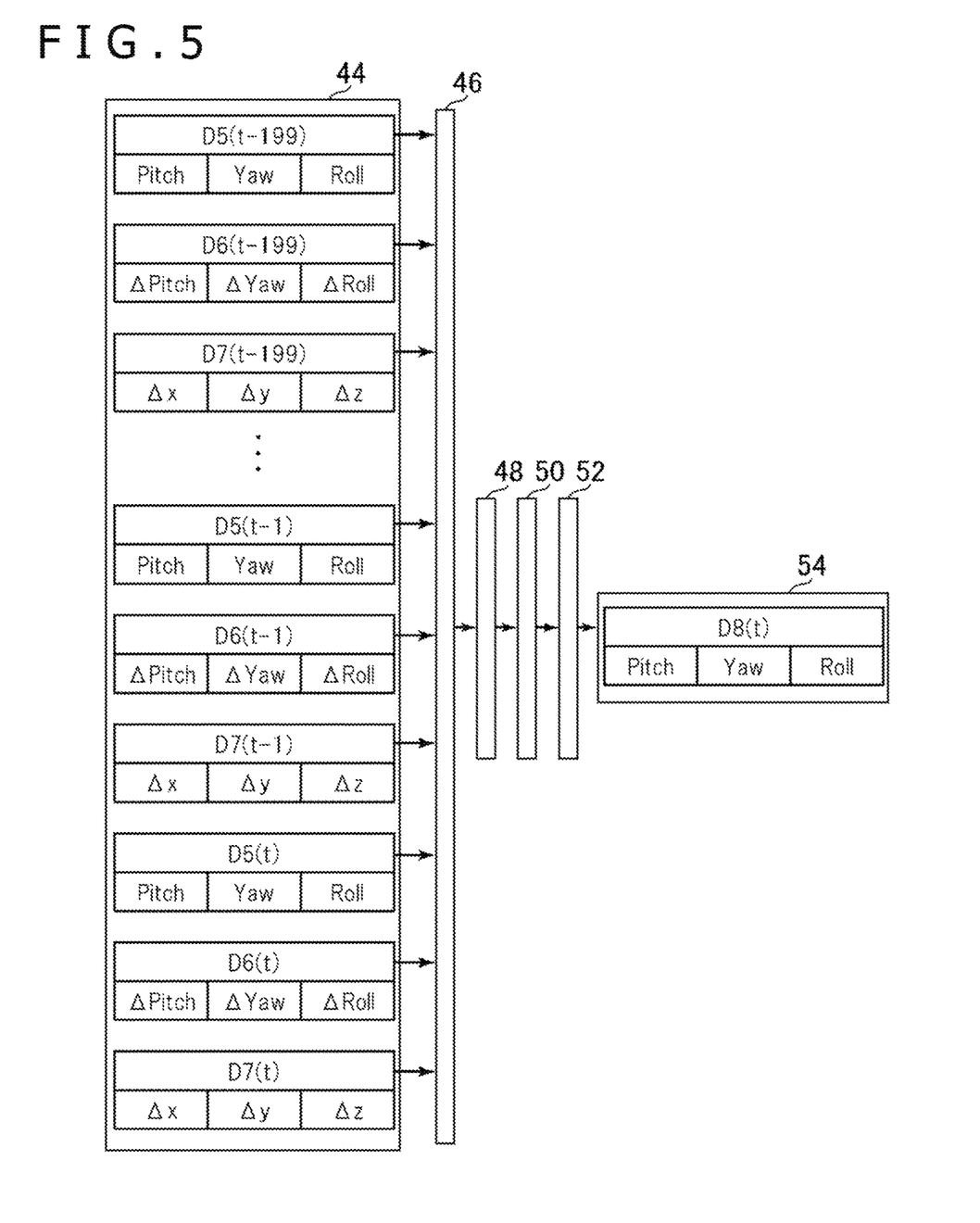
FIG. 5 is a diagram illustrating an example of a machine learning model used to estimate the orientation of a left-wrist node or a right-wrist node.

Hereinafter, the estimation of the orientation of the left-wrist node 42j will be described. It is noted that the orientation of the right-wrist node 42m can be similarly estimated by the method described below. FIG. 5 is a diagram illustrating an example of a machine learning model used to estimate the orientation of the left-wrist node 42j. As illustrated in FIG. 5, the machine learning model used to estimate the orientation of the left-wrist node 42j includes the input layer 44, the intermediate block 46, the first intermediate layer 48, the second intermediate layer 50, and the output layer 52, as in the case of the machine learning model illustrated in FIG. 4.

In the present embodiment, for example, data D5, data D6, and data D7 are input into the input layer 44 in response to the identification of the positions and orientations performed by the trackers 12. The data D5 represents a time series of orientations of the left hand. The data D6 represents a time series of angular velocities of the left hand. The data D7 represents a time series of velocities of the left hand.

In the present embodiment, for example, data representing a time series of orientations of the tracker 12b for the last 200 identifications is input into the input layer 44 as the time-series data D5(D5(t−199) to D5(t)).

Here, for example, data representing the orientation of the tracker 12b at the latest identification timing is represented as the data D5(t). Further, data representing the orientation of the tracker 12b at the immediately preceding identification timing is represented as the data D5(t−1). In addition, data representing the orientation of the tracker 12b at the identification timing 199 times before is represented as the data D5(t−199).

Further, in the present embodiment, as illustrated in FIG. 5, the time-series data D5(D5(t−199) to D5(t)) each includes three elements of a pitch angle (Pitch), a yaw angle (Yaw), and a roll angle (Roll). For example, the pitch angle, the yaw angle, and the roll angle respectively correspond to the pitch angle, the yaw angle, and the roll angle relative to the above-described reference orientation.

Further, in the present embodiment, the difference between a value of data representing the previously identified orientation and a value of data representing the orientation identified this time is used as a value representing an angular velocity. In addition, in the present embodiment, data representing a time series of angular velocities of the tracker 12b based on pieces of data representing the orientations of the tracker 12b for the last 201 identifications is input into the input layer 44 as the time-series data D6(D6(t−199) to D6(t)).

Here, for example, data representing the angular velocity corresponding to the difference between the orientation of the tracker 12b at the latest identification timing and the orientation of the tracker 12b at the immediately preceding identification timing is represented as the data D6(t). Further, data representing the angular velocity corresponding to the difference between the orientation of the tracker 12b at the immediately preceding identification timing and the orientation of the tracker 12b at the identification timing two times before is represented as the data D6(t−1). In addition, data representing the angular velocity corresponding to the difference between the orientation of the tracker 12b at the identification timing 199 times before and the orientation of the tracker 12b at the identification timing 200 times before is represented as the data D6(t−199).

Further, in the present embodiment, as illustrated in FIG. 5, the time-series data D6(D6(t−199) to D6(t)) each includes three elements of a pitch angular velocity (ΔPitch), a yaw angular velocity (ΔYaw), and a roll angular velocity (ΔRoll). As described above, the pitch angular velocity, the yaw angular velocity, and the roll angular velocity respectively correspond to the difference between pitch angles, the difference between yaw angles, and the difference between roll angles at two consecutive identification timings. Each of these angles is relative to the above-described reference orientation.

Further, in the present embodiment, data representing the time series of velocities of the tracker 12b based on pieces of data representing the positions of the tracker 12b for the last 201 identifications is input into the input layer 44 as the time-series data D7 (D7(t−199) to D7(t)).

Here, for example, data representing the velocity corresponding to the difference between the position of the tracker 12b at the latest identification timing and the position of the tracker 12b at the immediately preceding identification timing is represented as the data D7(t). Further, data representing the velocity corresponding to the difference between the position of the tracker 12b at the immediately preceding identification timing and the position of the tracker 12b at the identification timing two times before is represented as the data D7(t−1). In addition, data representing the velocity corresponding to the difference between the position of the tracker 12b at the identification timing 199 times before and the position of the tracker 12c at the identification timing 200 times before is represented as the data D7(t−199).

Further, in the present embodiment, as illustrated in FIG. 5, the time-series data D7(D7(t−199) to D7(t)) each includes three elements of Δx, Δy, and Δz. Each of Δx, Δy, and Δz corresponds to the velocity in a corresponding one of the three-axis directions. The velocities in the three-axis directions respectively correspond to the difference between x coordinate values, the difference between y coordinate values, and the difference between z coordinate values at two consecutive identification timings. Each coordinate value is relative to the above-described reference position.

As described above, in the present embodiment, the pieces of data including 1800 (200×3×3) elements are input into the input layer 44.

Then, eventually, the output layer 52 outputs data D8(t) as the output 54 on the basis of the above-described pieces of data input into the input layer 44 in a similar manner described with reference to FIG. 4. The data D8(t) corresponds to the orientation of the left wrist at the latest identification timing. As illustrated in FIG. 5, the time-series data D8(t) includes three elements of a pitch angle (Pitch), a yaw angle (Yaw), and a roll angle (Roll). The pitch angle, the yaw angle, and the roll angle respectively correspond to the pitch angle, the yaw angle, and the roll angle relative to the above-described reference orientation, for example.

In addition, in the present embodiment, the data D8(t) is used as the result of the estimation of the orientation of the left-wrist node 42j.

In the present embodiment, the machine learning model illustrated in FIG. 5 is assumed to have learned from data representing the orientation of the left wrist associated with a combination of the orientation of the left hand, the angular velocity of the left hand, and the velocity of the left hand in advance. Therefore, in the present embodiment, the data D8(t), which is the output obtained when the time-series data D5, the time-series data D6, and the time-series data D7 are input into the machine learning model in FIG. 5 that has finished learning, corresponds to the result of the estimation of the orientation of the left-wrist node 42j. It is noted that instead of the data representing a time series of velocities of the left hand, data representing a time series of positions of the left hand may be used as the time-series data D7.

Here, the machine learning model illustrated in FIG. 5 may have learned from data representing the angular velocity of the left wrist associated with a combination of the orientation of the left hand, the angular velocity of the left hand, and the position or the velocity of the left hand in advance. In this case, the data D8(t), which is the output obtained when the time-series data D5, the time-series data D6, and the time-series data D7 are input into the machine learning model in FIG. 5 that has finished learning, corresponds to the result of the estimation of the angular velocity of the left-wrist node 42j.

Further, in the present embodiment, a machine learning model similar to the machine learning model illustrated in FIG. 5 learns from data representing the orientation of the right wrist associated with a combination of the orientation of the right hand, the angular velocity of the right hand, and the velocity of the right hand. Then, when data representing a time series of orientations of the right hand, data representing a time series of angular velocities of the right hand, and data representing a time series of velocities of the right hand are input into the machine learning model that has finished learning, the output corresponds to the result of the estimation of the orientation of the right-wrist node 42m. It is noted that instead of the data representing a time series of velocities of the right hand, data representing a time series of positions of the right hand may be used.

Here, for example, the machine learning model similar to the machine learning model illustrated in FIG. 5 may have learned from data representing the angular velocity of the right wrist associated with a combination of the orientation of the right hand, the angular acceleration of the right hand, and the position or the velocity of the right hand. Then, when the data representing a time series of orientations of the right hand, the data representing a time series of angular velocities of the right hand, and the data representing a time series of velocities of the right hand are input into the machine learning model that has finished learning, the output corresponds to the result of the estimation of the angular velocity of the right-wrist node 42m.

In this manner, in the present embodiment, the orientation or the angular velocity of each of the left-wrist node 42j and the right-wrist node 42m is estimated.

In addition, in the present embodiment, for example, inverse kinematics is used for the estimation of the positions and orientations of the other nodes 42 based on the above-described estimation results.

In the present embodiment, the position and orientation of each node 42 included in the skeleton model 40 are estimated without having the user wear the tracker 12 on the chest or waist. Further, in the present embodiment, the orientation of the left-wrist node 42j and the orientation of the right-wrist node 42m are estimated from the pieces of data representing the positions and orientations of the trackers 12 limited to five. In addition, the positions of the left-elbow node 42i and the right-elbow node 42l can be accurately estimated using inverse kinematics on the basis of the above estimation results. According to the present embodiment, accurate body tracking can be performed in this manner without having the user wear many trackers 12. Specifically, accurate body tracking can be performed without having the user wear the trackers 12 on the chest, waist, and wrists, for example.

Hereinafter, functions of the entertainment apparatus 14 according to the present embodiment and processing performed by the entertainment apparatus 14 will be further described.

Figure 6:
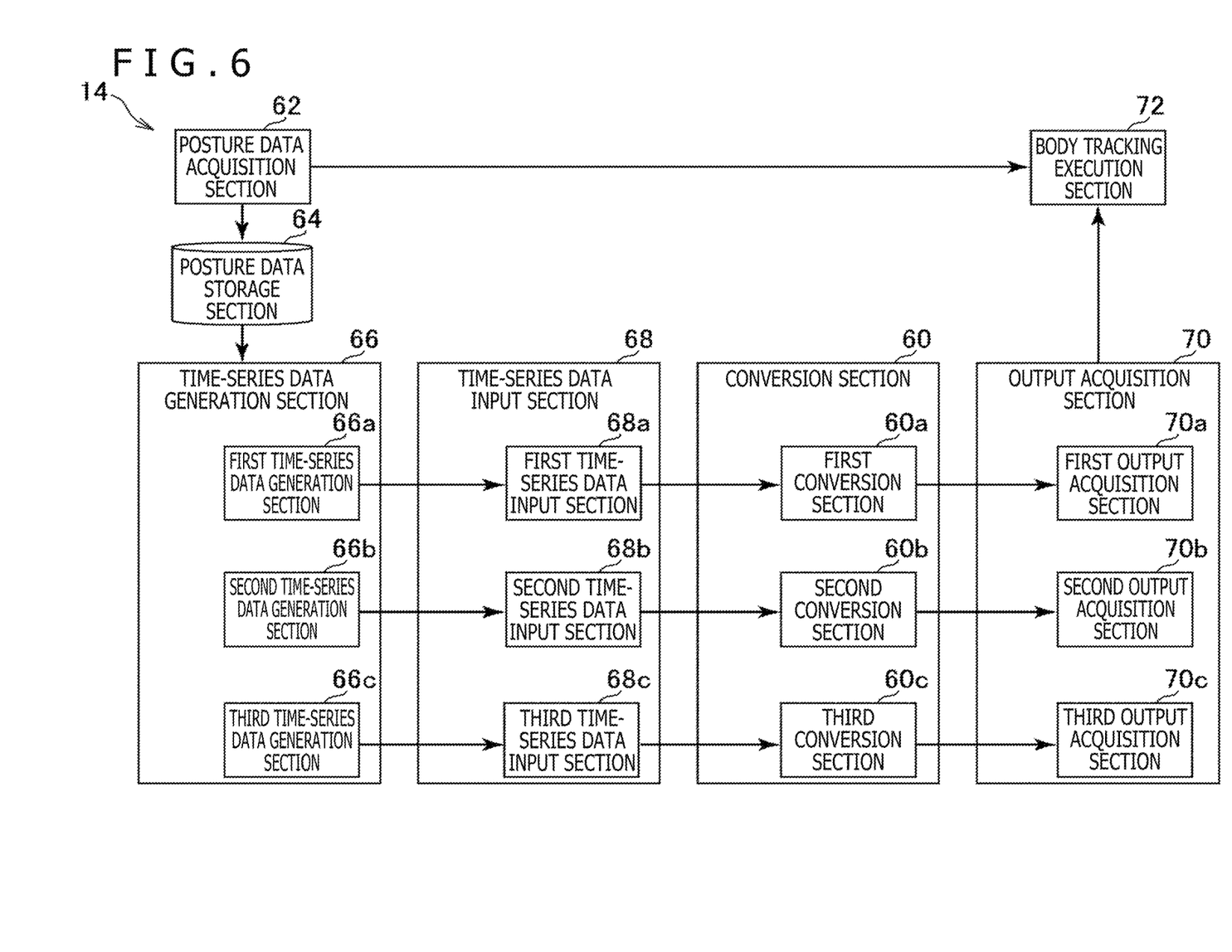
FIG. 6 is a functional block diagram illustrating an example of functions implemented in the entertainment apparatus according to the embodiment of the present invention.

FIG. 6 is a functional block diagram illustrating an example of the functions implemented in the entertainment apparatus 14 according to the present embodiment. It is noted that all of the functions illustrated in FIG. 6 do not need to be implemented in the entertainment apparatus 14 according to the present embodiment. Further, functions other than the functions illustrated in FIG. 6 may be implemented therein.

As illustrated in FIG. 6, the entertainment apparatus 14 functionally includes a conversion section 60, a posture data acquisition section 62, a posture data storage section 64, a time-series data generation section 66, a time-series data input section 68, an output acquisition section 70, and a body tracking execution section 72, for example. Further, the conversion section 60 includes a first conversion section 60a, a second conversion section 60b, and a third conversion section 60c. Further, the time-series data generation section 66 includes a first time-series data generation section 66a, a second time-series data generation section 66b, and a third time-series data generation section 66c. Further, the time-series data input section 68 includes a first time-series data input section 68a, a second time-series data input section 68b, and a third time-series data input section 68c. Further, the output acquisition section 70 includes a first output acquisition section 70a, a second output acquisition section 70b, and a third output acquisition section 70c.

The conversion section 60 is mainly implemented by the processor 30 and the storage section 32. The posture data acquisition section 62 is mainly implemented by the processor 30 and the input/output section 36. The posture data storage section 64 is mainly implemented by the storage section 32. The time-series data generation section 66, the time-series data input section 68, the output acquisition section 70, and the body tracking execution section 72 are mainly implemented by the processor 30. The entertainment apparatus 14 according to the present embodiment plays a role as a body part orientation estimation apparatus that estimates the orientations of the parts included in the body of the user.

The above functions may be implemented by the processor 30 executing a program that includes instructions corresponding to the above functions and that is installed in the entertainment apparatus 14, which is a computer. This program may be supplied to the entertainment apparatus 14 via a computer-readable information storage medium, such as an optical disc, a magnetic disc, a magnetic tape, a magneto-optical disk, or a flash memory, or via the Internet or the like, for example.

In the present embodiment, for example, the first conversion section 60a corresponds to the machine learning model that has finished learning and that is used to estimate the orientation of the chest node 42f. This machine learning model is exemplified in FIG. 4. It is noted that the first conversion section 60a does not need to be implemented by the machine learning model and may be implemented by general software or hardware such as a circuit, for example.

In the present embodiment, for example, the second conversion section 60b corresponds to the machine learning model that has finished learning and that is used to estimate the orientation of the left-wrist node 42j. This machine learning model is exemplified in FIG. 5. It is noted that the second conversion section 60b does not need to be implemented by the machine learning model and may be implemented by general software or hardware such as a circuit, for example.

In the present embodiment, for example, the third conversion section 60c corresponds to the machine learning model that has finished learning and that is used to estimate the orientation of the right-wrist node 42m. This machine learning model is similar to the machine learning model exemplified in FIG. 5. It is noted that the third conversion section 60c does not need to be implemented by the machine learning model and may be implemented by general software or hardware such as a circuit, for example.

In the present embodiment, for example, the posture data acquisition section 62 acquires pieces of posture data representing the positions and orientations of the trackers 12a to 12e identified at the predetermined sampling rate. Here, for example, each tracker 12 may generate posture data representing the position and orientation thereof at the predetermined sampling rate and then, in response to the generation, transmit the posture data generated thereby to the entertainment apparatus 14 via the relay apparatus 16. Further, for example, the camera-microphone unit 20 may generate posture data representing the positions and orientations of the trackers 12a to 12e at the predetermined sampling rate and then, in response to the generation, transmit the posture data generated by the camera-microphone unit 20 to the entertainment apparatus 14.

In the present embodiment, for example, the posture data storage section 64 stores the pieces of posture data acquired by the posture data acquisition section 62.

In the present embodiment, for example, the first time-series data generation section 66a generates pieces of time-series data to be input into the first conversion section 60a on the basis of the pieces of posture data stored in the posture data storage section 64. Here, for example, the three pieces of time-series data including the time-series data D1 representing a time series of orientations of the head, the time-series data D2 representing a time series of angular velocities of the left hand, and the time-series data D3 representing a time series of angular velocities of the right hand are generated. In this manner, the plurality of pieces of time-series data generated by the first time-series data generation section 66a may be pieces of time-series data for parts different from each other (here, for example, the head, the left hand, and the right hand) that are included in the body.

It is noted that the first time-series data generation section 66a may retain the generated time-series data. Then, for example, the time-series data D1(t) may be generated on the basis of the posture data at the latest identification timing. Then, the first time-series data generation section 66a may generate the time-series data D1 that includes the retained time-series data D1(t−198) to D1(t) as the time-series data D1 (t−199) to D1(t−1) and that further includes the generated time-series data D1(t). It is noted that each of the time-series data D2 and D3 may also be similarly generated on the basis of the retained time-series data and the posture data at the latest identification timing.

In the present embodiment, for example, the second time-series data generation section 66b generates pieces of time-series data to be input into the second conversion section 60b on the basis of the piece of posture data stored in the posture data storage section 64. Here, for example, the above-described three pieces of time-series data including the time-series data D5 representing a time series of orientations of the left hand, the time-series data D6 representing a time series of angular velocities of the left hand, and the time-series data D7 representing a time series of velocities of the left hand are generated. In this manner, the plurality of pieces of time-series data generated by the second time-series data generation section 66b may include time-series data representing the orientations of a part (here, for example, the left hand) included in the body and time-series data representing the angular velocities of the part (here, for example, the left hand). It is noted that each of the time-series data D5 to D7 may also be generated on the basis of the retained time-series data and the posture data at the latest identification timing, as described above.

In the present embodiment, for example, the third time-series data generation section 66c generates pieces of time-series data to be input into the third conversion section 60c on the basis of the pieces of posture data stored in the posture data storage section 64. Time series data for orientations of the right hand, time-series data for angular velocities of the right hand, and time-series data for velocities of the right hand are generated. In this manner, the plurality of pieces of time-series data generated by the third time-series data generation section 66c may include time-series data representing the orientations of a part (here, for example, the right hand) included in the body and time-series data representing the angular velocities of the part (here, for example, the right hand). It is noted that each of these pieces of time-series data may also be generated on the basis of the retained time-series data and the posture data at the latest identification timing, as described above.

In the present embodiment, for example, the time-series data input section 68 acquires the plurality of pieces of time-series data each representing the positions, postures, or motions of a part of the body. Then, in the present embodiment, the time-series data input section 68 inputs the plurality of pieces of time-series data to the conversion section 60 that has finished learning, for example. It is noted that the pieces of time-series data are not limited to the above-described pieces of data representing orientations, angular velocities (the differences between orientations), and velocities (the difference between positions). For example, the pieces of time-series data may be data representing positions, data representing accelerations (the difference between velocities), and data representing angular accelerations (the differences between angular velocities). Further, the time-series data may be, for example, data representing relative positions, postures, or motions of a certain part relative to another part. More specifically, for example, the time-series data may be data representing the differences between the orientations of a hand and the orientations of an arm (the relative orientations of the arm with respect to the orientations of the hand).

Here, in the present embodiment, the first time-series data input section 68a acquires the pieces of time-series data generated by the first time-series data generation section 66a, for example. Then, in the present embodiment, the first time-series data input section 68a inputs the pieces of time-series data into the first conversion section 60a, for example. Further, in the present embodiment, the second time-series data input section 68b acquires the pieces of time-series data generated by the second time-series data generation section 66b, for example. Then, in the present embodiment, the second time-series data input section 68b inputs the pieces of time-series data into the second conversion section 60b, for example. Further, in the present embodiment, the third time-series data input section 68c acquires the pieces of time-series data generated by the third time-series data generation section 66c, for example. Then, in the present embodiment, the third time-series data input section 68c inputs the pieces of time-series data into the third conversion section 60c, for example.

In the present embodiment, for example, the output acquisition section 70 acquires the result of the estimation of the position, posture, or motion of another part of the body that is closer to the center of the body than the part(s) of the body whose positions, postures, or motions are represented by the pieces of time-series data. The result of the estimation is an output obtained when the pieces of time-series data are input into the conversion section 60.

Here, in the present embodiment, the first output acquisition section 70a acquires an output obtained when the pieces of time-series data generated by the first time-series data generation section 66a are input into the first conversion section 60a, for example.

For example, as described above, the pieces of time-series data generated by the first time-series data generation section 66a are the pieces of data representing the orientations of the head, the angular velocities of the left hand, and the angular velocities of the right hand. In addition, in the skeleton model 40, the head node 42a and the chest node 42f are connected to each other via one link. Further, in the skeleton model 40, the left-hand node 42b and the chest node 42f are connected to each other via four links. Further, in the skeleton model 40, the right-hand node 42c and the chest node 42f are connected to each other via four links. In addition, the chest node 42f is the node 42 that is closer to the center of the body than any of the head node 42a, the left-hand node 42b, and the right-hand node 42c. In addition, in the present embodiment, for example, the result of estimation of the position, posture, or motion of the chest node 42f is acquired. The chest node 42f corresponds to the chest that is the part closer to the center of the body than the parts of the body whose positions, postures, or motions are represented by the pieces of time-series data generated by the first time-series data generation section 66a. It is noted that here, an estimated value of the position, posture, or motion, such as an estimated value of the orientation (a combination of the pitch angle, the yaw angle, and the roll angle), an estimated value of the angular velocity, or the like, may be acquired. Further, a score value serving as a basis for calculating the estimated value of the position, posture, or motion may be acquired.

Further, in the present embodiment, the second output acquisition section 70b acquires an output obtained when the pieces of time-series data generated by the second time-series data generation section 66b are input into the second conversion section 60b, for example.

For example, as described above, the pieces of time-series data generated by the second time-series data generation section 66b include at least two of the data representing the orientations of the left hand, the data representing the angular velocities of the left hand, the data representing the positions of the left hand, and the data representing the velocities of the left hand. In addition, in the skeleton model 40, the left-hand node 42b and the left-wrist node 42j are connected to each other via one link. In addition, the left-wrist node 42j is the node 42 that is closer to the center of the body than the left-hand node 42b. In addition, in the present embodiment, for example, the result of estimation of the position, posture, or motion of the left-wrist node 42j is acquired. The left-wrist node 42j corresponds to the wrist on a side of the left hand. The wrist is the part closer to the center of the body than the part of the body whose positions, postures, or motions are represented by the pieces of time-series data generated by the second time-series data generation section 66b. It is noted that here, an estimated value of the position, posture, or motion, such as an estimated value of the orientation (a combination of the pitch angle, the yaw angle, and the roll angle), an estimated value of the angular velocity, or the like, may be acquired. Further, a score value serving as a basis for calculating the estimated value of the position, posture, or motion may be acquired.

Further, in the present embodiment, the third output acquisition section 70c acquires an output obtained when the pieces of time-series data generated by the third time-series data generation section 66c are input into the third conversion section 60c, for example. In addition, in this case, the result of estimation of the position, posture, or motion of the right-wrist node 42m is acquired. The right-wrist node 42m corresponds to the wrist on a side of the right hand. The wrist is the part closer to the center of the body than the right hand that is the part of the body whose positions, postures, or motions are represented by the pieces of time-series data generated by the third time-series data generation section 66c. It is noted that here, an estimated value of the position, posture, or motion, such as an estimated value of the orientation (a combination of the pitch angle, the yaw angle, and the roll angle), an estimated value of the angular velocity, or the like, may be acquired. Further, a score value serving as a basis for calculating the estimated value of the position, posture, or motion may be acquired.

It is noted that the data output by the conversion section 60 and acquired by the output acquisition section 70 is not limited to the above-described data representing the orientation or the angular velocity (the difference between orientations). For example, the conversion section 60 may output data representing the velocity (the difference between positions), data representing the position, data representing the acceleration (the difference between velocities), or data representing the angular acceleration (the difference between angular velocities). Further, the conversion section 60 may output data representing the relative position, posture, or motion of a certain part relative to another part. More specifically, for example, the conversion section 60 may output data representing the difference between the orientation of a hand and the orientation of an arm (the relative orientation of the arm with respect to the orientation of the hand).

In the present embodiment, for example, the body tracking execution section 72 performs body tracking processing on the basis of the results of the estimation of the orientations acquired by the output acquisition section 70 and the pieces of posture data acquired by the posture data acquisition section 62. Here, for example, the position and the orientation of each of the plurality of nodes 42 included in the skeleton model 40 are estimated. It is noted that the body tracking execution section 72 may perform the body tracking processing on the basis of the pieces of posture data stored in the posture data storage section 64.

Here, for example, the position and orientation of the head node 42a may be determined on the basis of the posture data representing the position and orientation of the tracker 12a. Further, for example, the position and orientation of the left-hand node 42b may be determined on the basis of the posture data representing the position and orientation of the tracker 12b. Further, for example, the position and orientation of the right-hand node 42c may be determined on the basis of the posture data representing the position and orientation of the tracker 12c. Further, for example, the position and orientation of the left-foot node 42d may be determined on the basis of the posture data representing the position and orientation of the tracker 12d. Further, for example, the position and orientation of the right-foot node 42e may be determined on the basis of the posture data representing the position and orientation of the tracker 12e.

Further, as described above, the body tracking execution section 72 may use inverse kinematics to estimate, on the basis of the determined or estimated positions or orientations of the nodes 42, the positions of the nodes 42 that have not been estimated and the orientations of the nodes 42 that have not been estimated.

Conceivably, it is possible to accurately estimate the orientations of the nodes 42 corresponding to the parts included in the body by using temporal motion patterns of rotation of the other nodes 42 that are away from the center of the body than the parts and that are connected to the nodes 42 via one or more links. Thus, the present embodiment focuses on this point. As described above, on the basis of an output obtained when a plurality of pieces of time-series data each representing the orientations or angular velocities of a part of the body is input into the conversion section 60, the orientation of another part of the body that is closer to the center of the body than the part is estimated.

Figure 7:
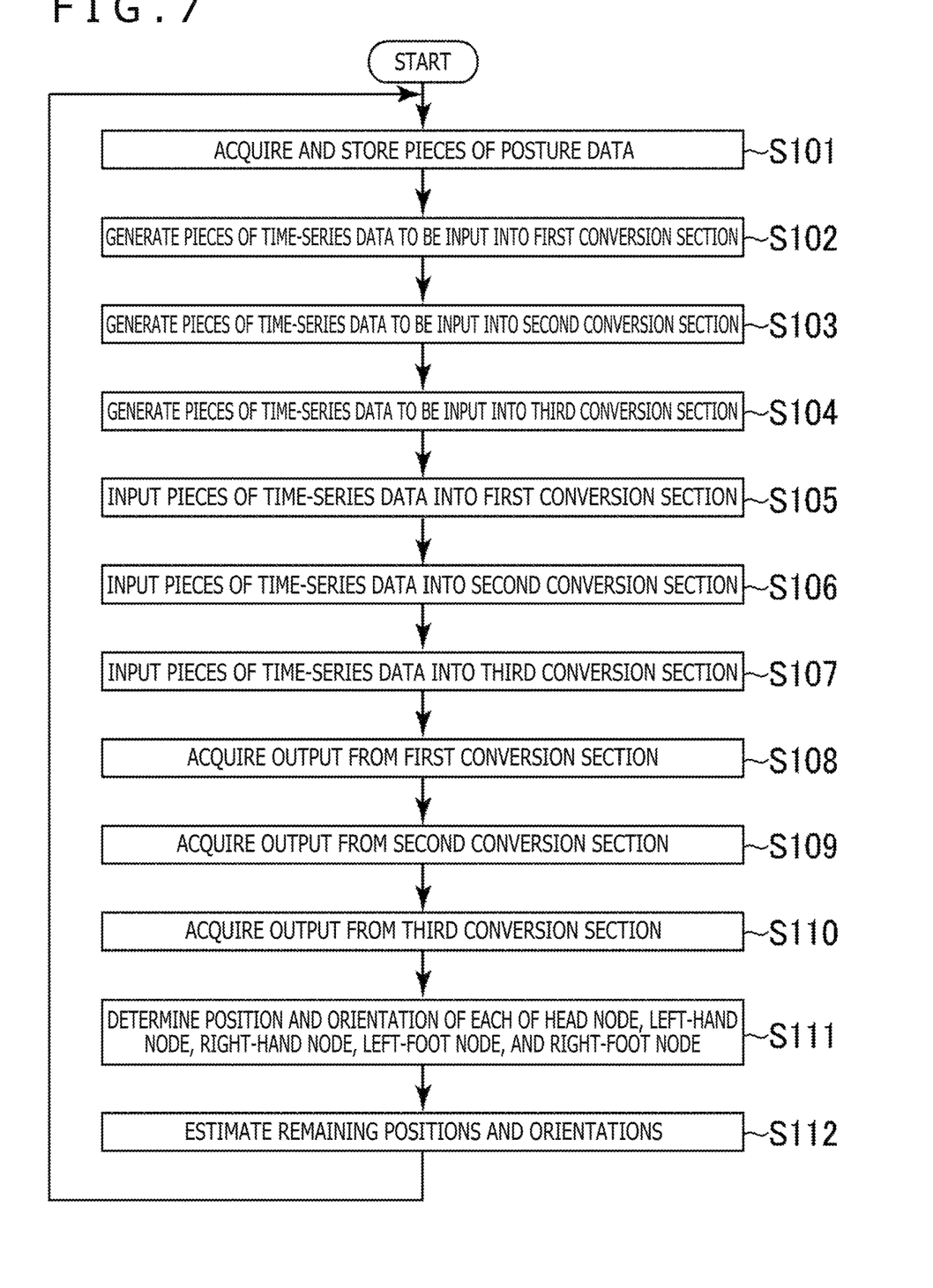
FIG. 7 is a flow diagram illustrating an example of a flow of processing performed by the entertainment apparatus according to the embodiment of the present invention.

Here, an example of a flow of the processing performed by the entertainment apparatus 14 according to the present embodiment will be described with reference to a flow diagram illustrated in FIG. 7. In this processing example, the following processes, which are illustrated in S101 to S112, are repeatedly performed at the predetermined sampling rate.

First, the posture data acquisition section 62 acquires pieces of posture data generated by the trackers 12 and causes the posture data storage section 64 to store these pieces of posture data (S101). These pieces of posture data represent the positions and orientations of the respective trackers 12 at the latest identification timing. Here, for example, the posture data acquisition section 62 acquires the posture data of each of the trackers 12a to 12e. Each posture data represents the position and orientation of the corresponding tracker 12.

Then, the first time-series data generation section 66a generates pieces of time-series data to be input into the first conversion section 60a on the basis of the pieces of posture data stored in the posture data storage section 64 (S102).

Then, the second time-series data generation section 66b generates pieces of time-series data to be input into the second conversion section 60b on the basis of the pieces of posture data stored in the posture data storage section 64 (S103).

Then, the third time-series data generation section 66c generates pieces of time-series data to be input into the third conversion section 60c on the basis of the pieces of posture data stored in the posture data storage section 64 (S104).

Then, the first time-series data input section 68a acquires the pieces of time-series data generated in the process illustrated in S102 and inputs the pieces of time-series data into the first conversion section 60a (S105).

Then, the second time-series data input section 68b acquires the pieces of time-series data generated in the process illustrated in S103 and inputs the pieces of time-series data into the second conversion section 60b (S106).

Then, the third time-series data input section 68c acquires the pieces of time-series data generated in the process illustrated in S104 and inputs the pieces of time-series data into the third conversion section 60c (S107).

Then, the first output acquisition section 70a acquires the result of estimation of the orientation of the chest node 42f that is an output from the first conversion section 60a corresponding to the input in the process illustrated in S105 (S108).

Then, the second output acquisition section 70b acquires the result of estimation of the orientation of the left-wrist node 42j that is an output from the second conversion section 60b corresponding to the input in the process illustrated in S106 (S109).

Then, the third output acquisition section 70c acquires the result of estimation of the orientation of the right-wrist node 42m that is an output from the third conversion section 60c corresponding to the input in the process illustrated in S107 (S110).

Then, the body tracking execution section 72 determines the position and orientation of each of the head node 42a, the left-hand node 42b, the right-hand node 42c, the left-foot node 42d, and the right-foot node 42e in this cycle (S111). Here, for example, the position and orientation of each of the head node 42a, the left-hand node 42b, the right-hand node 42c, the left-foot node 42d, and the right-foot node 42e may be determined on the basis of the corresponding posture data acquired in the process illustrated in S101.

Then, the body tracking execution section 72 uses inverse kinematics to estimate the remaining positions and orientations that have not been determined or acquired as the estimation results in the processes illustrated in S108 to S111 among the positions and orientations of the nodes 42 included in the skeleton model 40 (S112).

In this manner, the positions and orientations of all the nodes 42 included in the skeleton model 40 in one cycle are estimated. Then, the processing returns to the process illustrated in S101.

As for the processes illustrated in the above-described processing example, the execution order of each step is not limited to the one described above. For example, the execution order of the processes illustrated in S102 to S104, the execution order of the processes illustrated in S105 to S107, and the execution order of the processes illustrated in S108 to S110 are not limited to those described above.

Further, the processes illustrated in S105 and S108 may be sequentially performed following the process illustrated in S102. Similarly, the processes illustrated in S106 and S109 may be sequentially performed following the process illustrated in S103. Similarly, the processes illustrated in S107 and S110 may be sequentially performed following the process illustrated in S104.

Further, each of the above-described steps may be performed in parallel. For example, the processes illustrated in S102, S105, and S108, the processes illustrated in S103, S106, and S109, and the processes illustrated in S104, S107, and S110 may be performed in parallel.

It is noted that as described above, the first conversion section 60a may be the machine learning model used to estimate the orientation of the waist node 42g, not the chest node 42f. In this case, the first output acquisition section 70a may acquire the result of the estimation of the orientation of the waist node 42g.

It is noted that the present invention is not limited to the above-described embodiment.

For example, the tracker 12a may be a head-mounted display (HMD). In this case, a video corresponding to the result of various types of processes of the game processing or the like corresponding to the positions or orientations of the plurality of parts included in the user may be displayed on a display section of the HMD, for example.

Further, for example, a part or all of the functions illustrated in FIG. 6 may be implemented by the trackers 12.

Further, the above-described specific character strings and numerical values and the specific character strings and numerical values in the drawings are examples, and character strings and numerical values are not limited to these character strings and numerical values.

The invention claimed is:

1. An estimation apparatus comprising:
a time-series data input section configured to acquire a plurality of pieces of time-series data each representing positions, postures, or motions of parts of a body on which trackers are worn and
configured to input the plurality of pieces of time-series data into a conversion section,
wherein the pieces of time-series data include first time-series data representing orientations of a head included in the body, second time-series data representing angular velocities of a left hand included in the body, and third time-series data representing angular velocities of a right hand included in the body; and
an output acquisition section configured to acquire a result of estimation of an orientation of a chest or a waist included in the body or a result of estimation of an angular velocity of the chest or the waist included in the body,
the result of the estimation being an output obtained when the pieces of time-series data are input into the conversion section, and
wherein no trackers are worn on the waist or the chest.

2. The body part orientation estimation apparatus according to claim 1, wherein
the plurality of pieces of time-series data includes at least two of time-series data representing orientations of the parts, time-series data representing angular velocities of the parts, time-series data representing positions of the parts, and time-series data representing velocities of the parts.

3. The estimation apparatus according to claim 2, wherein
the output acquisition section acquires a result of estimation of an orientation or an angular velocity of a wrist on a side of the hand included in the body,
wherein no tracker is worn on the wrist.

4. The estimation apparatus according to claim 1, wherein
the conversion section includes a machine learning model that has finished learning.

5. An estimation method comprising:
acquiring a plurality of pieces of time-series data each representing positions, postures, or motions of parts of a body on which trackers are worn;
inputting the plurality of pieces of time-series data into a conversion section,
wherein the pieces of time-series data include first time-series data representing orientations of a head included in the body, second time-series data representing angular velocities of a left hand included in the body, and third time-series data representing angular velocities of a right hand included in the body; and
acquiring a result of estimation of a position, a posture, or a motion of a chest or a wrist included in the body, the result of the estimation being an output obtained when the pieces of time-series data are input into the conversion section,
wherein no trackers are worn on the waist or the chest.

6. A non-transitory computer readable medium having stored thereon a program causing a computer to execute:
by a time-series data input section, acquiring a plurality of pieces of time-series data each representing positions, postures, or motions of parts of a body on which trackers are worn;
by the time-series data input input section, inputting the plurality of pieces of time-series data into a conversion section,
wherein the pieces of time-series data include first time-series data representing orientations of a head included in the body, second time-series data representing angular velocities of a left hand included in the body, and third time-series data representing angular velocities of a right hand included in the body; and
by an output acquisition section, acquiring a result of estimation of a position, a posture, or a motion of a chest or a waist included in the body, the result of the estimation being an output obtained when the pieces of time-series data are input into the conversion section,
wherein no trackers are worn on the waist or the chest.

* * * * *